US010092784B2

(12) United States Patent
Dehondt et al.

(10) Patent No.: US 10,092,784 B2
(45) Date of Patent: Oct. 9, 2018

(54) SAFETY SECURING DEVICE AND SECURING ASSEMBLY COMPRISING SUCH A DEVICE

(76) Inventors: Thierry Jean Alain Cornil Dehondt, Tinqueux (FR); Francois Jean Victor Le Gall, Paris (FR); Bertrand Marie Pierre Bruno De Vismes, Versailles (FR)

( * ) Notice: Subject to any disclaimer, the term of this patent is extended or adjusted under 35 U.S.C. 154(b) by 580 days.

(21) Appl. No.: 13/883,630

(22) PCT Filed: Nov. 4, 2011

(86) PCT No.: PCT/FR2011/052578
§ 371 (c)(1),
(2), (4) Date: May 6, 2013

(87) PCT Pub. No.: WO2012/062987
PCT Pub. Date: May 18, 2012

(65) Prior Publication Data
US 2013/0213735 A1    Aug. 22, 2013

(30) Foreign Application Priority Data
Nov. 8, 2010    (FR) ..................................... 10 04357

(51) Int. Cl.
*A62B 35/00*    (2006.01)
*F16B 45/02*    (2006.01)
*A63B 29/02*    (2006.01)

(52) U.S. Cl.
CPC ...... *A62B 35/0037* (2013.01); *A62B 35/0087* (2013.01); *A63B 29/02* (2013.01); *F16B 45/02* (2013.01); *Y10T 24/45366* (2015.01)

(58) Field of Classification Search
CPC . A63B 29/02; A62B 35/0037; A62B 35/0043; A62B 35/0068; A62B 35/0075; A62B 35/0081; A62B 35/0056; F16B 45/02
USPC ....................................................... 24/600.1
See application file for complete search history.

(56) References Cited

U.S. PATENT DOCUMENTS

| 4,423,796 | A | * | 1/1984 | Sulowski | .................. | E06C 7/18 |
| | | | | | | 182/8 |
| 2009/0200107 | A1 | * | 8/2009 | Gassner | ............. | A62B 35/0087 |
| | | | | | | 182/5 |
| 2010/0012425 | A1 | * | 1/2010 | Gassner | ........................... | 182/5 |

(Continued)

FOREIGN PATENT DOCUMENTS

DE            3347725 A1 * 7/1985 ............. A62B 35/04

*Primary Examiner* — Daniel P Cahn
(74) *Attorney, Agent, or Firm* — Bachman & LaPointe, P.C.

(57) ABSTRACT

A safety securing device has two carabiners intended to receive a securing element. Each of the carabiners includes a hook provided with an opening. A detection device is activated upon insertion of the securing element into the hook. A closure door and a device for locking the door are coupled to a stressing device arranged to activate the locking device when the door is closed. The carabiners are interconnected by a transmission device that connects the detection device of one carabiner to the locking device of the other carabiner. The activation of the detection device of one of the carabiners triggers the deactivation of the locking device of the other carabiner.

4 Claims, 8 Drawing Sheets

(56) References Cited

U.S. PATENT DOCUMENTS

2011/0031065 A1* 2/2011 Strasser ............. A62B 35/0087
 182/3
2011/0047764 A1* 3/2011 Strasser ................ F16B 45/025
 24/599.5
2011/0198152 A1* 8/2011 Dowie .............................. 182/3
2017/0348555 A1* 12/2017 Dehondt ............ A62B 35/0087

* cited by examiner

SAFETY SECURING DEVICE AND SECURING ASSEMBLY COMPRISING SUCH A DEVICE

BACKGROUND

The invention concerns a safety securing device and a securing assembly provided with such a device.

Producing a safety securing device comprising two carabiners intended to receive a securing element is known, each of said carabiners comprising:
- a hook provided with an opening for introducing said element,
- a door for closing said opening, said door having an open position for receiving said element in said hook and a closed position for holding said element in said hook,
- a means of locking said door coupled to a constraint means arranged to activate said locking means when said door is closed.

This device is in particular integrated in an assembly also comprising a harness for securing a person, the carabiners being secured to said harness.

Such a device can in particular be used in tree climbing or rock climbing activities, or with a view to protecting site operators working at a height.

Having two carabiners enables the user to pass from one securing element to another while still being in a safe condition; to do this, the user checks that, at any moment, at least one carabiner is secured to a securing element.

However, such a device does not provide optimum safety for a user who, inadvertently, may find himself in a situation where no carabiner is secured.

SUMMARY OF THE INVENTION

The aim of the invention is to overcome this drawback.

To this end, and according to a first aspect, the invention proposes a safety securing device comprising two carabiners intended to receive a securing element, each of said carabiners comprising:
- a hook provided with an opening for introducing said element,
- a detection means arranged to be able to be activated in detection by introducing said element into said hook,
- a door for closing said opening, said door having an open position for receiving said element in said hook and a closed position for holding said element in said hook,
- a means of locking said door coupled to a constraint means arranged to activate said locking means when said door is closed, said carabiners being connected together by transmission means respectively connecting the means of detecting one carabiner to the means of locking the other carabiner, said transmission means being arranged so that the activation of the means of detecting one carabiner, whichever it may be, causes the deactivation of the means of locking the other carabiner.

Thus it is guaranteed that the deactivation of the means of locking a carabiner, whichever it may be, cannot be effected as long as the means of detecting the other carabiner has not been activated.

In other words, the withdrawal of the securing element from one carabiner is prevented as long as the introduction of a securing element in the other carabiner is not detected.

According to a second aspect, the invention proposes a safety securing assembly for a person, said assembly comprising a harness and a device as described above.

BRIEF DESCRIPTION OF THE DRAWINGS

Other particularities and advantages of the invention will emerge from the following description, made with reference to the accompanying figures, in which.

DETAILED DESCRIPTION

Figure 1A:
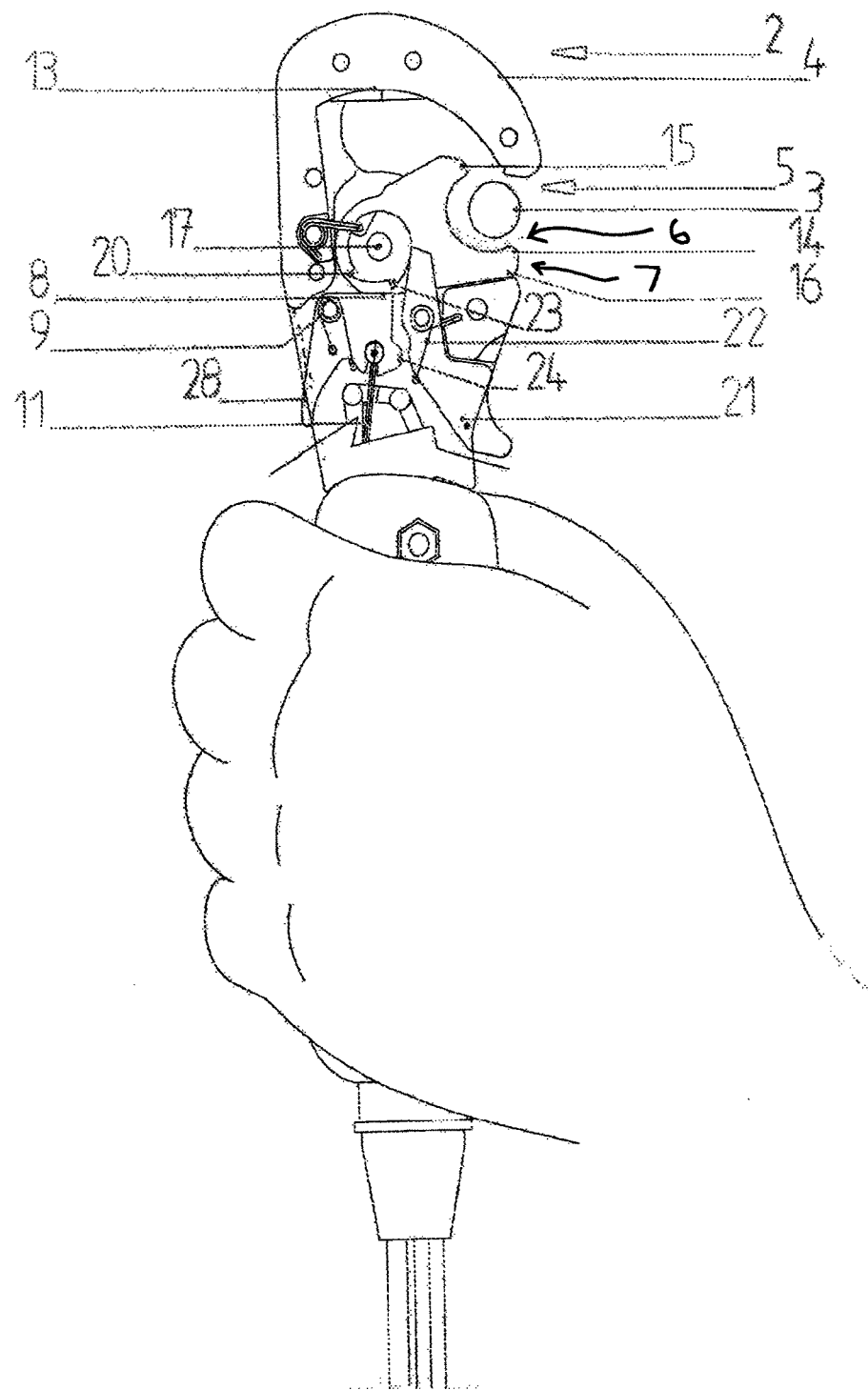
FIG. 1 are partial views on one side of a carabiner of a device according to one embodiment, the door of said carabiner being open so as to enable a securing element to be received (FIG. 1a) and closed with the securing element introduced into said carabiner (FIG. 1b).

With reference to the figures, a description is given of a safety securing device 1 comprising two carabiners 2 intended to receive a securing element 3, each of said carabiners comprising:
- a hook 4 provided with an opening 5 for introducing said element,
- a detection means 6 arranged to be able to be activated in detection; i.e., detect the element 3, by introducing said element into said hook,
- a door 7 for closing said opening, said door having an open position for receiving said element in said hook and a closed position for holding said element in said hook,
- a locking part 8 or means 8 of locking said door coupled to a constraint means 9 arranged to activate said locking means when said door is closed, said carabiners being connected together by transmission means 10 respectively connecting the means 6 of detecting one carabiner to the means 8 of locking the other carabiner, said transmission means being arranged so that the activation of the means 6 of detecting one carabiner, whichever it may be, causes the deactivation of the means 8 of locking the other carabiner.

As will be seen in the embodiments depicted, the door 7 is activated in the closed position by introducing the element 3, which transmits a force onto said door, and the result is an activation of the corresponding locking means 8.

In alternative embodiments that are not described, provision can be made for the door 7 to be forced towards its closed position under the effect of a spring means, the open position of the door being achieved temporarily when the element 3 is introduced into the carabiner 2 and said door remaining in a closed position when it is not urged to meet said spring means.

According to one embodiment, the two carabiners 2 are similar.

According to an embodiment that is not shown, the constraint means 9 is integrated in the locking means 8, said locking means being formed in particular by an elastic blade.

According to the embodiments depicted, at least one detection means 6 is a part mounted so as to be able to move with respect to the hook 4 between a non-detection position and a detection position.

According to the embodiments depicted, at least one locking means 8 is a part mounted so as to be to move with respect to the hook 4 between a locking position and an unlocking position.

According to the embodiments depicted, at least one transmission means 10 comprises a cable 11 connecting a detection means 6 to a locking means 8, said means being in the form of parts mounted so as to be able to move with respect to the hook 4, said transmission means being mounted so that activation of said detection means actuates said cable 11, here in traction, so as to deactivate said locking means.

In particular, use is made here of a Bowden cable, that is to say the cable 11 is mounted so as to slide in a sheath 12 each end of which is mounted on a respective hook 4, said cable being able to slide in said sheath.

As mentioned previously, the two carabiners 2 may be similar. As a result they are both provided with detection 6 and locking 8 means in the form of parts mounted so as to be able to move with respect to the hook 4. In addition, two transmission means 10 may be provided, comprising a cable 11 connecting each detection means 6 to the corresponding locking means 8.

According to the embodiments depicted, at least one hook 4 comprises a zone 13 for receiving the element 3. The zone 13 is in a location where the element 3 comes to be positioned once introduced into said hook. A gate 14 has two arms 15, 16 mounted for rotation on said hook. The gate 14 is arranged to have a configuration of reception, i.e., to receive said element between said arms, through the opening 5, and a configuration of housing, i.e., to house said element between said arms and said zone, the door 7 being formed by one of said arms, for example the arm 16.

In such an arrangement, the gate 14 is actuated in the housing configuration by pressing the element 3 against the arm 15 when it is introduced into the carabiner 2, said element transmitting a force onto said gate, and therefore onto the door 7.

Figure 1B:
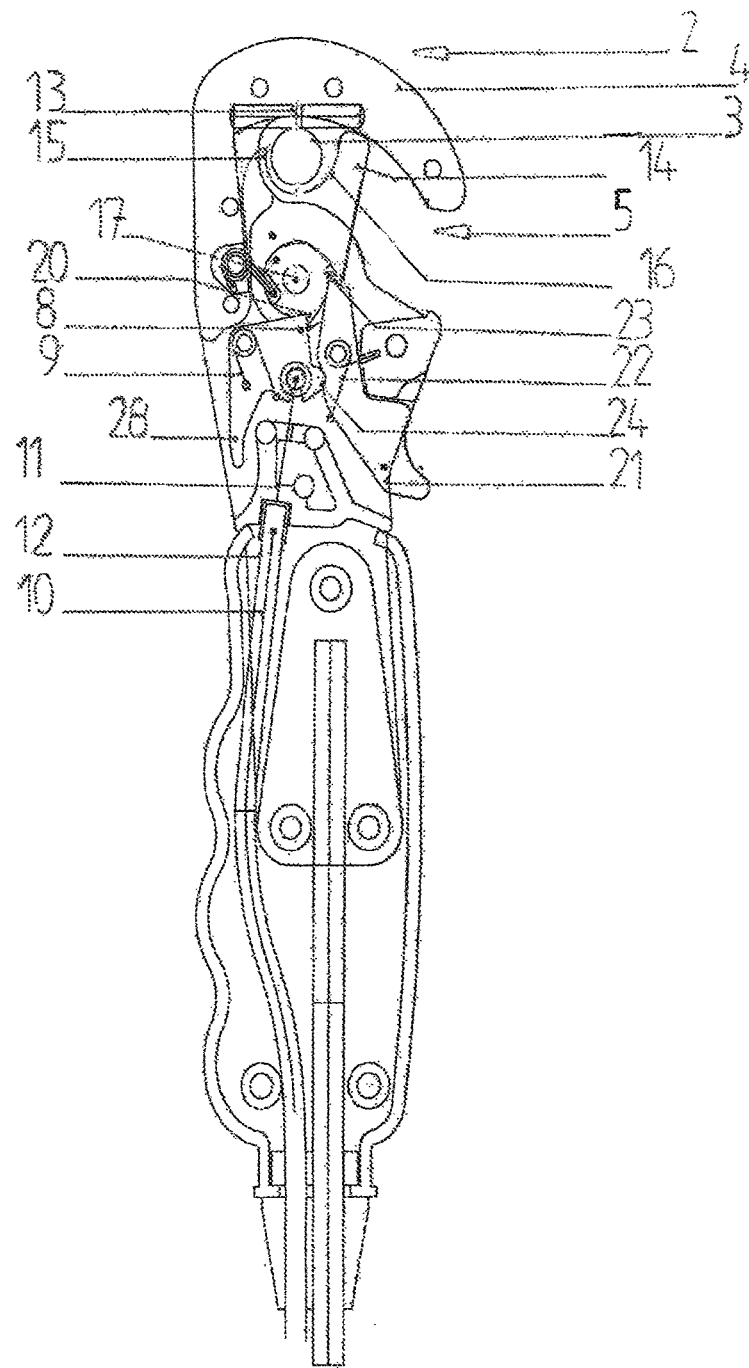
Figure 2:
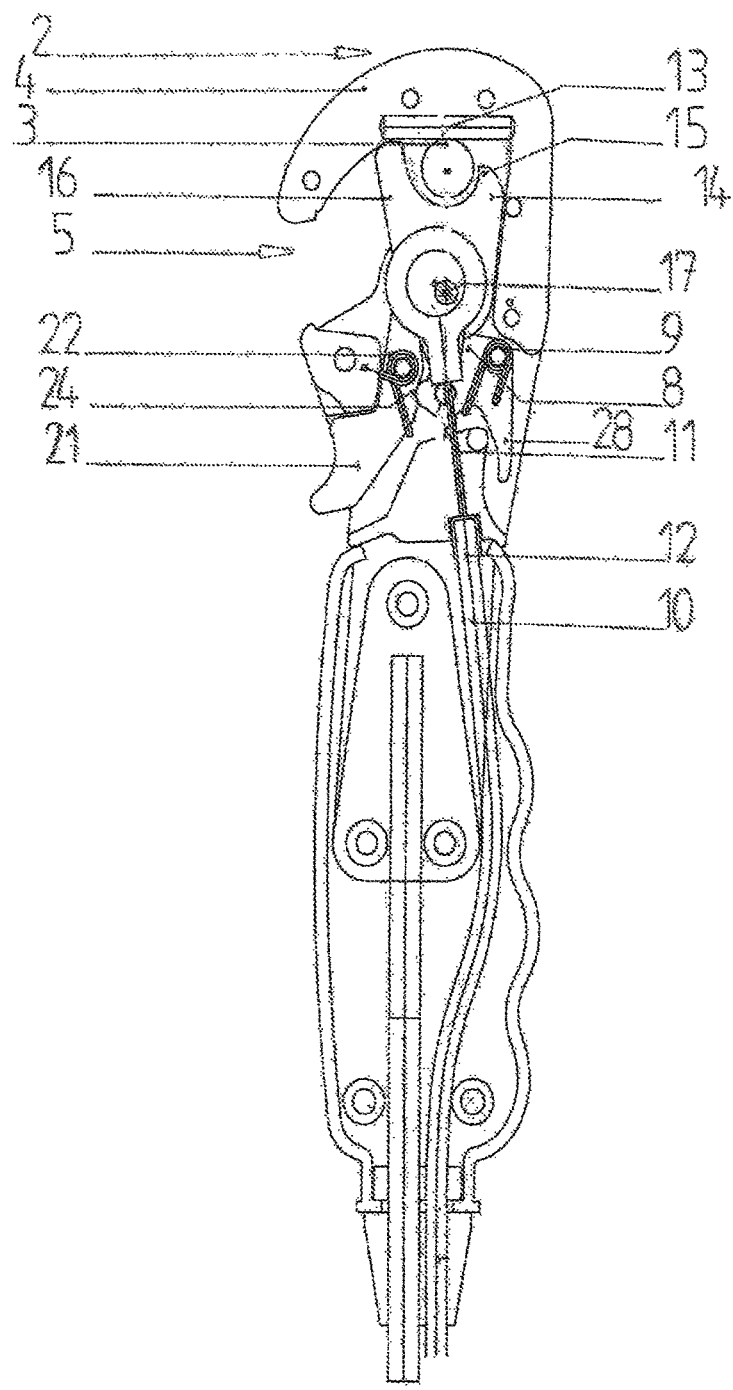
FIG. 2 is a view similar to FIG. 1b on a side opposite to that in FIG. 1.

According to the embodiment in FIGS. 1 and 2, the detection means 6 is formed by the gate 14, the corresponding cable 11 being connected at a distance from its rotation axis 17, the non-detection position corresponding to the reception configuration and the detection position corresponding to the housing configuration.

Provision is also made here for the gate 14 to be coupled to a bistable spring driving it towards one or another of its configurations, so that a force is required for making it pass from one configuration to the other.

Figure 3A:
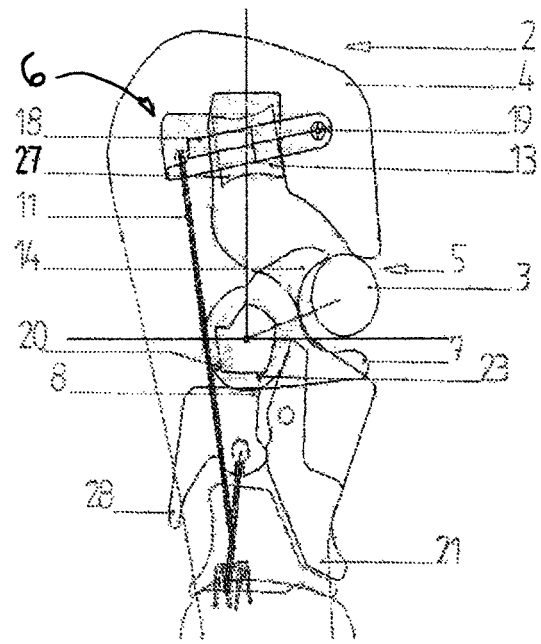
FIG. 3 are similar to FIG. 1 according to a variant embodiment.
Figure 3B:
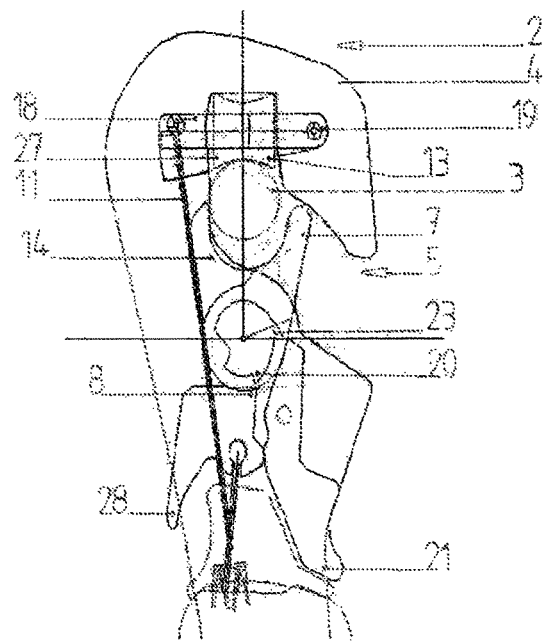

According to the variant in FIG. 3, the detection means 6 is formed by a lever 18 mounted for rotation with respect to the hook 4 opposite the reception zone 13, said lever being able to move between a non-detection position (FIG. 3*a*) where it is separated from said zone towards the inside of said hook, and a detection position (FIG. 3*b*) where it is close to said zone, the cable 11 being connected at a distance from the rotation axis 19 of said lever.

In this embodiment, the lever 18 is put in the detection position by pressing the element 3 against it.

Such an embodiment makes it possible to detect the actual presence of the element 3, and not only its introduction into the hook 4, as is the case in the embodiment described above.

To allow good sliding of the element 3 against the lever 18, provision is made here for the mounting of a pulley 27 on said lever.

According to the embodiments depicted, the gate 14 comprises a first tooth 20, the locking means 8 being mounted for rotation with respect to the hook 4 and the constraint means 9 being in the form of a spring, said means being respectively arranged to put said locking means in engagement with said tooth when said gate is in the housing configuration, so as to activate said locking means.

According to the embodiments depicted, at least one carabiner 2, and in particular both when the carabiners are similar, comprises an additional means 21 of locking the door 7, said means being in the form of a part mounted so as to be able to move with respect to the hook 4 between a locking position and an unlocking position, said additional locking means being coupled to an additional constraint means 22 arranged to activate it when said door is closed, said additional locking means comprising an abutment zone for deactivating it by action of the user.

Such an arrangement makes it possible to benefit from "double safety".

This is because, when the two carabiners 2 each receive a securing element 3, which corresponds in particular to situations where the user has just secured a carabiner 2 to a new element 3 while the other carabiner 2 was already secured, their respective locking means 8 are both deactivated.

The result is a temporary risk for the user that the two carabiners 2 disengage from the securing elements 3.

The presence of the additional locking means 21 removes this risk since the user is then obliged to perform two simultaneous intentional manoeuvres to disengage the elements 3 from the two carabiners 2.

It should be noted that, the additional locking means 21 being distant from the path of the element 3 in the embodiments depicted, the risk of an injury to the hand of the user by said element is limited.

As before, and not depicted, provision can be made for the addition of constraint means 22 to be integrated in the additional locking means 21, which would in particular be formed by an elastic blade.

According to the embodiments depicted, the gate 14 comprises a second tooth 23, the additional locking means 21 being mounted for rotation with respect to the hook 4, the additional constraint means 22 being in the form of a spring, said means being respectively arranged to put said additional locking means in engagement with said tooth when said gate is in the housing configuration, so as to activate said additional locking means.

According to the embodiments depicted, the locking means 8 comprises a stop surface 24, the additional locking means being arranged to be in abutment against said surface when said locking means 8 is activated, so as not to be able to be deactivated, and so that said abutment is eliminated by deactivation of said locking means 8, so as to allow its deactivation.

As depicted, an emergency unlocking means 28 is provided, formed here by a lug, integrated in the locking means 8, to be actuated under traction with a finger, said emergency unlocking means making it possible to unlock the two carabiners 2 in all situations, in particular in the event of breakage of the cable 11.

In a way that is not shown, provision can be made for the distance between the tip of the cable 11 and the tip of the sheath 12 to be adjustable by fitting a sheath tip element, such as can in particular be found for adjusting the tension of bicycle brake cables, based on a system of screws or pins to be fixed in an orifice in the carabiner 2, said carabiner being provided with several possible adjustment orifices. It is thus possible to adjust the tension of the cable 11.

Figure 5:
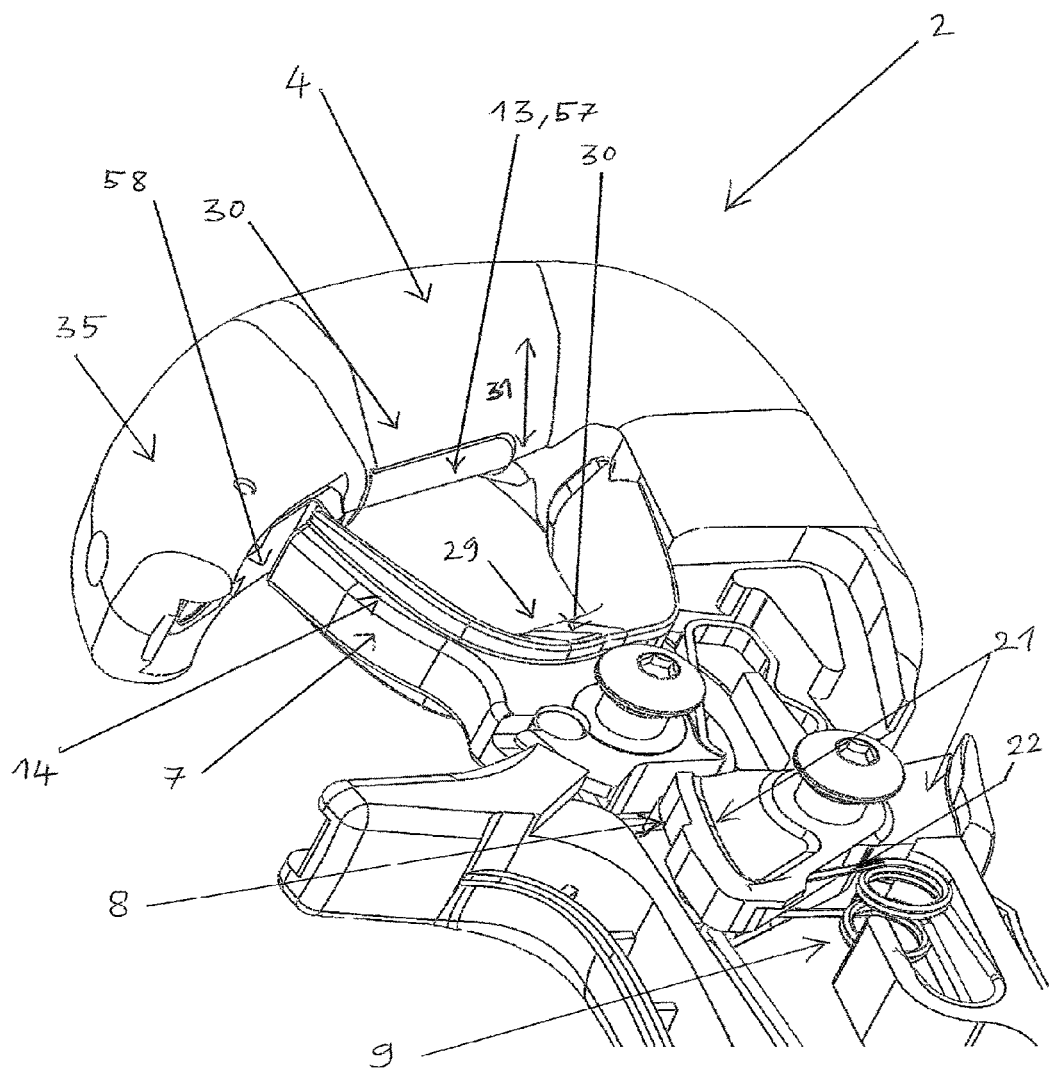
FIG. 5 is a partial perspective view of a carabiner of a device according to a variant embodiment, FIG. 6 are side views corresponding to FIG. 5, the related locking means being activated (FIG. 6a) and deactivated (FIG. 6b)

FIG. 5 shows a variant embodiment of a carabiner 2 having the features described below:

- the additional locking means 21 is mounted on the same axis as that of the locking means 8;
- the constraint means 9 and additional constraint means 22 are merged, being in the form of the same spring;
- the hooks 4 have a free top end with sufficient overhang 35 for the locking of a given door 7 to take place, when the other door 7 is rotated with a view to extracting the element 3 inserted therein, before there is a situation of extraction of said element. It will be noted that this feature also applies in the embodiments described in FIGS. 1 to 3;
- The zone 13 for receiving the securing element 3 is in the form of an anti-wear part 57 for sliding on the element 3, with high abrasion resistance, with a very great hardness and very low roughness, attached at the top of the hook 4, said part being in particular exchangeable to enable it to be replaced when it is worn. It may be in the form of a part that is fixed or mounted for rotation so as to turn when the securing element 3 slides in the hook 4. Here it is in the form of a spindle.
- the hook 4, around the abutment zone 13, is bevelled on either side, as is the zone 29 situated between the arms 15, 16, so as to prevent buttressing of the hook 4, locking the sliding thereof, when the element 3 is inclined greatly with respect to the perpendicular to the plane defined by said arms; the surfaces 30 defined by the respective bevels are in particular defined so as to have a slope length 31 close to the pitch of the element 3 when the latter is a cable obtained by the twisting in a helix of a plurality of sub-cables. In the embodiment depicted, the arms 15, 16 are also bevelled, so as to take into account an abutment of the element 3 on said arms;
- the possibility of using a flat screwdriver or similar tool for pushing the locking means 8 downwards when it is wished to effect an emergency unlocking of the gate 14 will be noted.

Figure 6A:
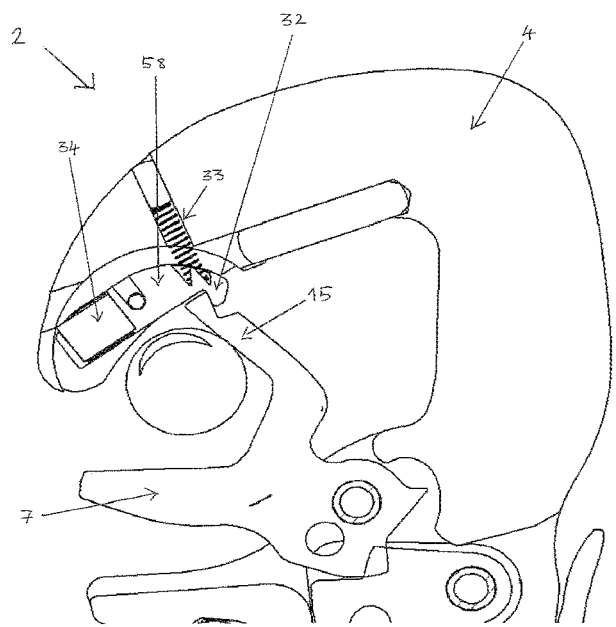
Figure 6B:
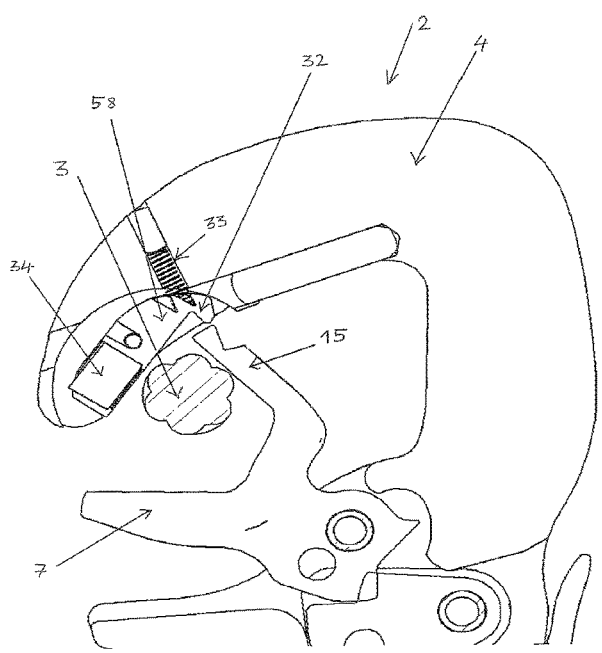

A supplementary locking means 58 is also provided, the functioning of which is described in relation to FIG. 6. It will be noted that this means 58 could also be incorporated, in a way that is not shown, in the embodiments described in FIGS. 1 to 3.

Its function is to prevent the device 1 being able to be deceived by the introduction of an object other than a securing element 3, in particular by a finger of a user.

To this end, starting from the fact that the element 3 is usually a metal cable that can be attracted by a magnet, or even a metal rod such as a ladder rung, a supplementary locking means 58 defined as follows is provided on the device 1.

The supplementary locking means 58 comprises a bolt 32 able to move between a position of locking the door 7 in the open position, here by locking the arm 15, and a retracted position of releasing the actuation of said door in the closed position, said bolt being actuated towards its locking position by a spring 33, said supplementary locking means being provided with a magnet 34 intended to interact with the element 3 in order to actuate said bolt towards its retracted position.

Thus the introduction of a finger or of an object that cannot be attracted by a magnet does not make it possible to achieve closure of the door 7 of a given carabiner 2, because of the locking effected by the bolt 32, nor to release the opening of the door 7 of the other carabiner 2.

The bolt 32 is here mounted for rotation in the top part of the hook 4.

Figure 4:
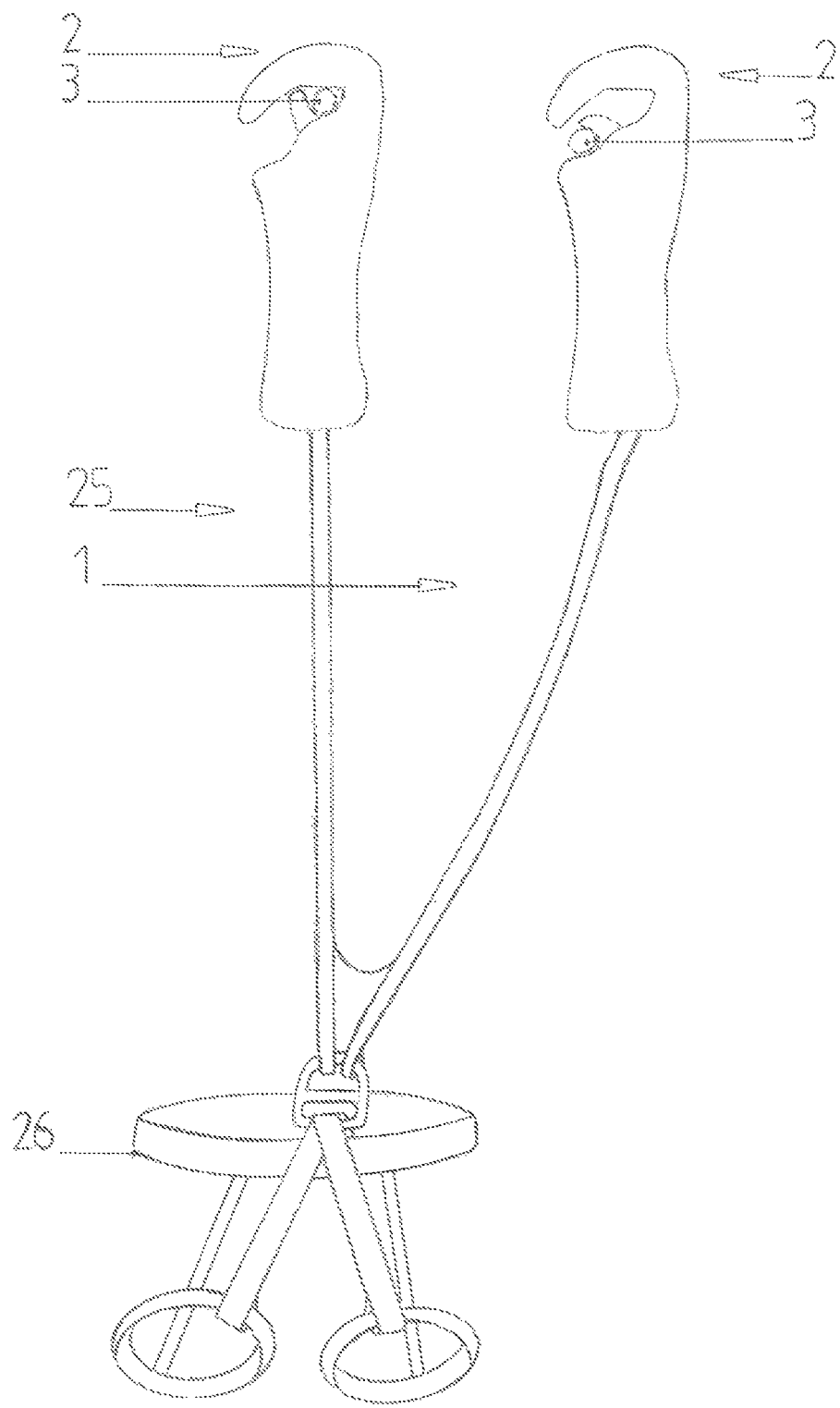
FIG. 4 is a general schematic view in perspective, according to one embodiment, of a securing assembly comprising a device according to the invention.

A description is now given, with reference to FIG. 4, of a securing assembly 25 for the safety of a person, said assembly comprising a harness 26 and a device 1, the carabiners 2 being secured to said harness, here by straps.

Harness 26 means a device for securing a person.

In the embodiment shown, the harness 26 is based on straps made so as to receive the legs and trunk of the user.

The harness 26 is in particular provided with adjustment means, not shown, for adapting it to the dimensions of the user.

Figure 7:
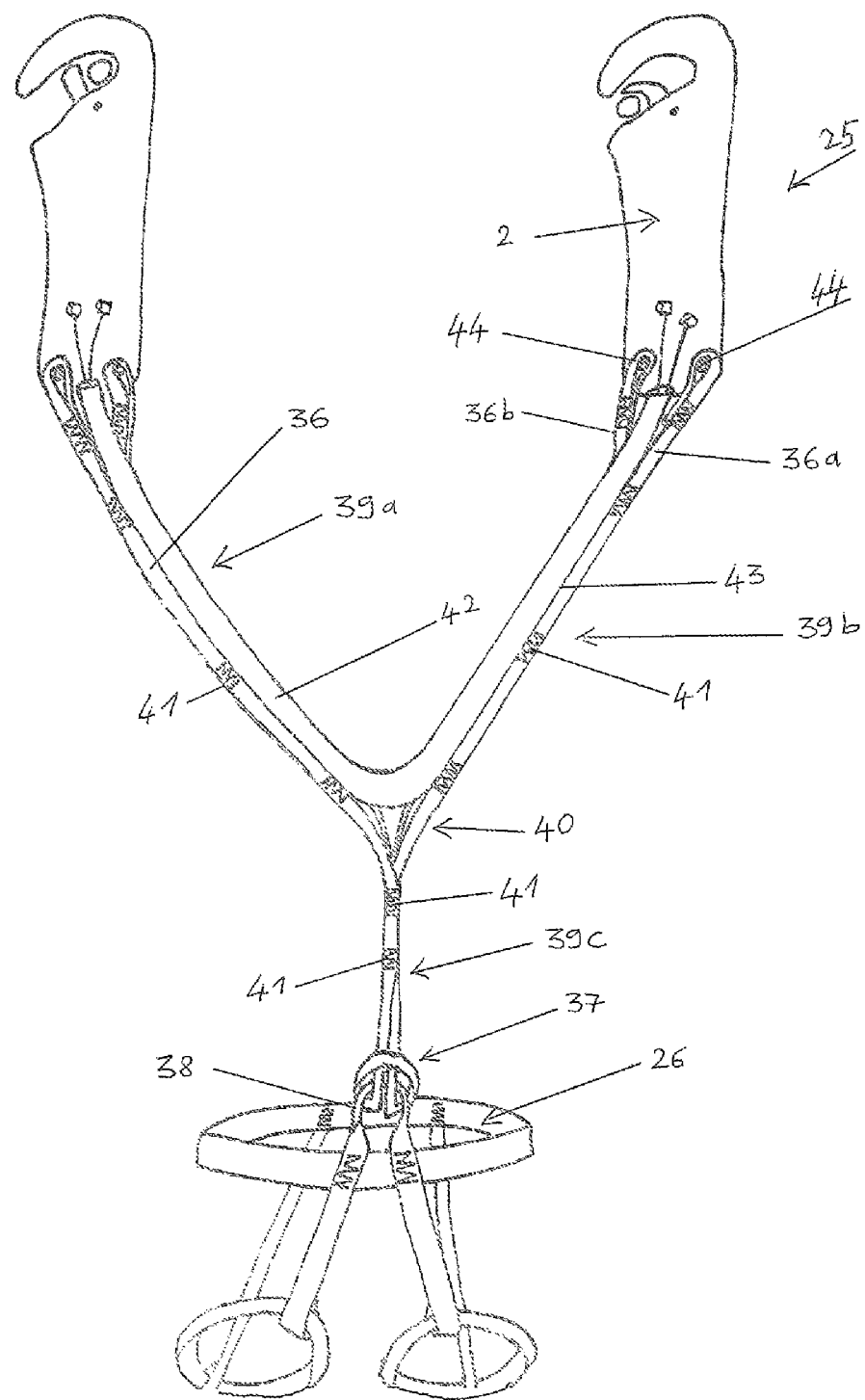
FIG. 7 is a detailed schematic view in perspective of a securing assembly according to an embodiment that is a variant of that in FIG. 4.

With reference to FIG. 7, a detailed variant embodiment of a securing assembly 25 is described.

The assembly 25 comprises:
- the harness 26,
- a strap 36, in particular made from Dyneema®, for taking up force in the event of tensile stress between the carabiners 2 and said harness, connecting together said carabiners and passing through a point of connection to said harness, here via a crown knot 37 produced in a loop 38 issuing from said harness, said strap forming two lengths 39a, 39b connecting to said carabiners and a link 39c connecting to said harness issuing from a central zone 40, the length 39c comprising two strap thicknesses 36 sewn together, by stitches 41,
- a protective sleeve 42 surrounding the transmission elements 10, a border 43 of said sleeve being sewn, by stitches 41, to said strap, except over a central zone length 40, in particular over a length of around 5 to 10 cm, which enables said transmission elements to form a curvature with a radius sufficiently great to prevent accentuated folding that might risk degrading them.

In the embodiment shown, the strap 36 is duplicated, consisting of two elementary sub-straps 36a, 36b sandwiching, by stitching, the border 43 of the sleeve and being partially sewn one on the other along the length 39c, said length then comprising four thicknesses of elementary sub-straps.

The strap 36 is sub-divided into two at two attachment points 44 provided on the carabiners 2.

The length 3c being significantly more supple than the lengths 3a and 3b, it is possible to achieve a twisting at this level without degrading the assembly 25.

In particular, provision is made for not effecting stitching 41 at the central strap part 36, so as to enable the knot 37 to be produced.

The production of a knot 37 limits the number of components, reduces the weight and eliminates the risk of opening of a component such as a quick link or carabiner normally used.

The strap 36 may optionally be of variable width, in particular in the area of connection to the carabiners 2, so as to fit within the width of the inside of said carabiners.

It is possible to provide a device, not shown, for dissipating energy in the length 39c connected to the harness 26, for example in the form of fusible stitching.

The invention claimed is:

1. A safety securing device comprising a first carabiner and a second carabiner configured to receive a securing element, each of the first and second carabiners comprising:
   a hook provided with an opening, said opening configured to receive said securing element,
   said hook having a receiving zone configured to contain said securing element;
   a gate rotatably mounted to the hook and rotatable around a rotation axis, said gate having two arms configured to receive said securing element, wherein said gate is configured to rotate into a housing configuration, said housing configuration comprises said securing element being located between said two arms and said receiving zone;
   wherein at least one of said two arms is configured for closing said opening when said gate is positioned in said housing configuration;
   a locking part mounted to said hook and coupled to said gate; said locking part configured to move with respect to said hook between a locked position and an unlocked position, said locking part being coupled to a constraint spring; said constraint spring configured to activate said locking part when said gate closes said opening,
   said first carabiner connected to said second carabiner by a first cable connecting the first carabiner gate to said second carabiner locking part,
   wherein when said first carabiner gate is moved into the housing configuration of said first carabiner gate, said first carabiner gate activates the first cable to cause deactivation of the second carabiner locking part,
   a first sheath coupled between the hook of the first carabiner and the hook of the second carabiner, said first cable being configured to slide in said first sheath,
   said first carabiner connected to said second carabiner by a second cable connecting the second carabiner gate to said first carabiner locking part,
   wherein when said second carabiner gate is moved into the housing configuration of said second carabiner gate, said second carabiner gate activates the second cable to cause deactivation of said first carabiner locking part,
   a second sheath coupled between the hook of the first carabiner and the hook of the second carabiner, said second cable being configured to slide in said second sheath.

2. The safety securing device according to claim 1, wherein the first carabiner gate comprises a first carabiner first tooth, and wherein the constraint spring of the first carabiner is arranged to put said first carabiner locking part in engagement with said first carabiner first tooth when said first carabiner gate is in the housing configuration of said first carabiner gate and when the second carabiner gate is in a receiving configuration of said second carabiner gate, so as to activate said first carabiner locking part; and wherein the second carabiner gate comprises a second carabiner first tooth, and wherein the constraint spring of the second carabiner is arranged to put said second carabiner locking part in engagement with said second carabiner first tooth when said second carabiner gate is in the housing configuration of said second carabiner gate, so as to activate said second carabiner locking part.

3. The safety securing device according to claim 1, wherein the first carabiner comprises an additional first carabiner locking part configured for locking the first carabiner gate, said additional first carabiner locking part being mounted so as to be able to move with respect to the first carabiner hook between a first carabiner locking position and first carabiner unlocking position, said additional first carabiner locking part being coupled to an additional first carabiner constraint spring arranged so as to activate said additional first carabiner locking part when the first carabiner gate is closed, said additional first carabiner locking part comprising first carabiner abutment zone for deactivating said additional first carabiner locking part by action of a user, and wherein the second carabiner comprises an additional second carabiner locking part configured for locking the second carabiner gate, said additional second carabiner locking part being mounted so as to be able to move with respect to the second carabiner hook between a second carabiner locking position and second carabiner unlocking position, said additional second carabiner locking part being coupled to an additional second carabiner constraint spring arranged so as to activate said additional second carabiner locking part when the second carabiner gate is closed, said additional second carabiner locking part comprising a second carabiner abutment zone for deactivating said additional second carabiner locking part by action of the user.

4. The safety securing device according to claim 3, wherein the first carabiner gate comprises a first carabiner second tooth, the additional first carabiner locking part being rotatably mounted with respect to the first carabiner hook, said additional first carabiner constraint spring, being arranged to put said additional first carabiner locking part in engagement with said first carabiner second tooth when the first carabiner gate is in the housing configuration of the first carabiner gate, so as to activate said additional first carabiner locking part, and wherein the second carabiner gate comprises a second carabiner second tooth, the additional second carabiner locking part being rotatably mounted with respect to the second carabiner hook, said additional second carabiner constraint spring, being arranged to put said additional second carabiner locking part in engagement with said second carabiner second tooth when the second carabiner gate is in the housing configuration of the second carabiner gate, so as to activate said additional second carabiner locking part.

* * * * *